Aug. 11, 1959 R. P. CROW ET AL 2,899,547

PAGING COMMUNICATION SYSTEM

Filed Aug. 22, 1955 2 Sheets-Sheet 1

INVENTORS
Robert P. Crow
BY Russell R. Yost Jr.
Mueller & Aichele
Attys.

Aug. 11, 1959 R. P. CROW ET AL 2,899,547

PAGING COMMUNICATION SYSTEM

Filed Aug. 22, 1955 2 Sheets-Sheet 2

INVENTORS
Robert P. Crow
Russell R. Yost Jr.
BY Mueller & Aichele
Attys.

United States Patent Office 2,899,547

Patented Aug. 11, 1959

2,899,547

PAGING COMMUNICATION SYSTEM

Robert P. Crow, Park Ridge, Ill., and Russell R. Yost, Jr., Phoenix, Ariz., assignors to Motorola, Inc., Chicago, Ill., a corporation of Illinois Application August 22, 1955, Serial No. 529,838

8 Claims. (Cl. 250—6)

This invention relates to communication systems and more particularly to an improved receiver for use in a frequency-modulation paging communication system.

The contemplated paging system in general uses a narrow-band frequency-modulation system to establish communication in a given building or area. The transmitting antenna is in the form of a large loop around the building or area to be covered so that relatively low power can be used to reduce interference outside the area. A typical transmitter produces, for example, a ten watt output with a three kilocycle modulation deviation on a carrier frequency of 50–200 kilocycles. The persons to be paged each carry a pocket-sized, miniature, transistorized, frequency-modulation receiver; which receiver is completely self-contained, including batteries and a miniature speaker. Each receiver has its own selective call so that messages may be sent to the receivers individually. These calling tones are in the range of, for example, 100–700 c.p.s. Voice signals in this range are filtered out at the transmitter to prevent false operation. Upon the receipt of such a call, the selected receiver produces a buzzing noise in its speaker, whereupon the user pushes a spring-biased switch from a standby position to an operated position to condition the receiver to receive the message.

This type of system is particularly useful for paging and for other communication in factories, hospitals, department stores, offices and many other establishments. The transmitter, together with a push button selector box and microphone, can be located at a central station in the area; and miniature portable radio receivers are supplied to personnel who are frequently paged or who should be in close contact with their offices or with the plant operations. The miniature receivers, for example, may be placed in a shirt or coat pocket, or they may be clipped to a belt or hung around the neck of the user with a strap attachment.

Where it is desired to transmit a message to a particular individual, the switchboard operator or other centrally located person, merely presses the particular selective call button. This causes the transmitted carrier to be frequency modulated by a tone of a particular frequency, and this tone produces a buzz in the speaker of a selected receiver. The user then pushes a spring-biased switch on the receiver from a "standby" position to a "listen" position to enable his receiver to reproduce the message.

It is accordingly, a general object of the present invention to provide an improved miniature portable receiver for use in a paging type of communication system such as that described above.

Another object of the invention is to provide such an improved miniature receiver that lends itself to practical commercial construction and which is simple to operate.

Another object of the invention is to provide such an improved miniature receiver that is constructed to consume relatively low power in its standby condition, that which is capable of providing a positive indication when in its standby condition in response to a call from the transmitter directed to that receiver.

A feature of the invention is the provision of a receiver including a resonant electro-mechanical vibratory unit which responds to the selected call by intermittently connecting the sound reproducer or speaker of the receiver to a source of potential in the presence of such a call and at the audible frequency rate of the calling tone so as to produce a buzzing in the speaker. It should be noted that each receiver in the system incorporates a different vibratory unit each of which responds to its own calling tune to produce a distinctive buzz peculiar to that receiver.

Another feature of the invention is the provision of such an improved receiver that includes a manually operated control switch for switching the speaker directly across the output of the final amplifier of the receiver in place of the vibratory unit so as to condition the receiver to reproduce a message sent out to it.

A still further feature of the invention is the provision of such an improved receiver in which the manually operated control switch also changes the bias of the final amplifier from the class B to class A type of operation so that adequate gain and undistorted output is provided for the received message and yet minimum current drain takes place during standby.

The above and other features of the invention, which are believed to be new, are set forth with particularity in the appended claims. The invention in itself, however, together with further objects and advantages thereof, may best be understood by reference to the following description when taken in conjunction with the accompanying drawings in which:

The invention provides a receiver for use in a selective paging system for utilizing a received carrier wave modulated with a calling tone of a selected frequency and subsequently modulated with audio intelligence intended for such receiver. The receiver comprises means for demodulating the received carrier wave to produce a tone of a selected frequency and to produce subsequent audio information. An amplifier is coupled to the demodulating means for amplifying the tone and audio information produced thereby. The receiver also includes a sound reproducer, and a frequency-selective electromechanical vibratory unit connected to the reproducer. The vibratory unit is responsive to the frequency of the demodulated tone, and it intermittently connects the reproducer to a source of potential in the presence of the tone. A suitable switch is provided having a first position in which the vibratory unit is connected to the output of the amplifier, and having a second position in which the reproducer is directly connected to the amplifier.

Figure 1:
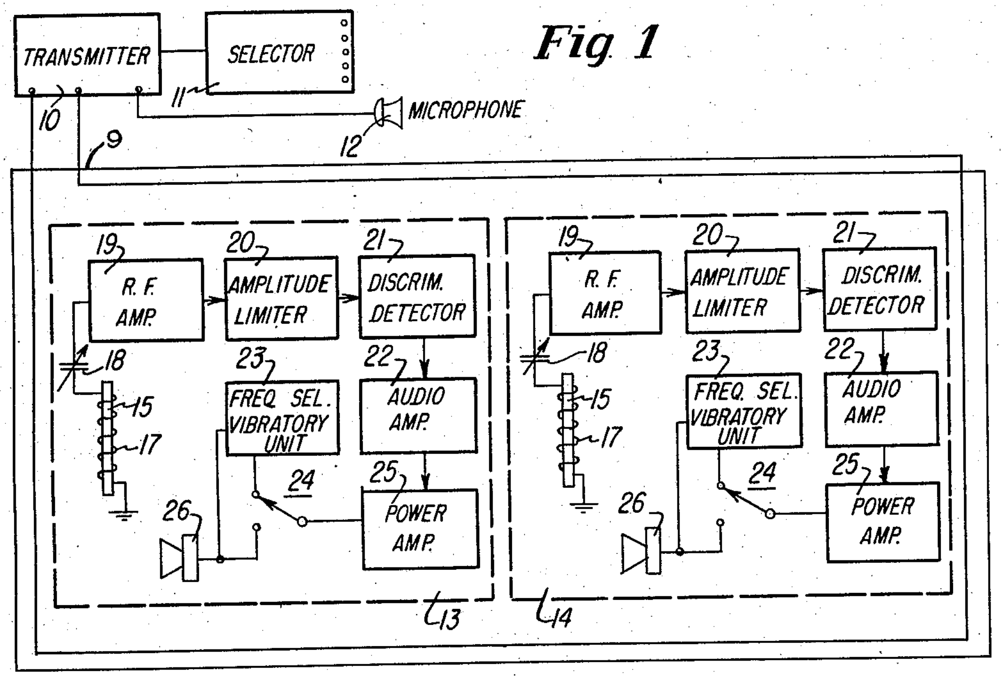
Fig. 1 is a schematic representation of a paging system incorporating the improved receiver of the present invention.

As shown in Fig. 1, the paging system in which the receiver of the present invention is used includes a transmitter 10 whose output terminals are connected to an antenna 9. The antenna is in the form of a closed loop that surrounds the building or area to which the communication is to be restricted. A selector 11 is connected to the transmitter 10, as is a microphone 12. As previously noted, the transmitter may, for example, have a ten watt output and produce a carrier wave of from 50 to 200 kilocycles frequency-modulated by a 3 kilocycle deviation. Depression of any one of the buttons of selector 11 causes the carrier to be frequency modulated by a continuous tone of frequency corresponding to the particular one of the receivers with which communication is desired.

Two receivers 13, 14 are shown in Fig. 1; but of course, many more receivers, each with its own call tone frequency, can be used.

The receivers, preferably, are completely transistorized so that they may have the required minature size, and also so that their power consumption may be as low as possible. Each receiver has a loop antenna 17 surrounding an iron core 15. One side of antenna 17 is connected to a point of reference potential or ground, and the other side of the antenna is coupled through a capacitor 18 to radio frequency amplifier 19. The antenna 17 and capacitor 18 form a series-resonant network tunable to the frequency of the carrier used in the system. Amplifier 19 is a four-stage neutralized transistor radio frequency amplifier and the output terminals of the amplifier are coupled through an amplitude limiter 20 to a frequency modulation discriminator detector 21. The detector 21 is coupled through an audio amplifier 22 to a power amplifier 23, and the latter is connected to a switch 24 of the single-pole-double-throw type. Switch 24 in its "standby" position connects the power amplifier to a frequency-selective vibratory unit 25, and the output terminals of unit 25 are connected to a sound reproducer or speaker 26. Switch 24 also has a "listen" position in which the power amplifier is directly connected to the speaker. The switch is preferably spring biased to its standby position.

Whenever it is desired to communicate with one of the receivers, the push-button in selector 11 for producing the tone corresponding to that receiver, is depressed. This causes the carrier of transmitter 10 to be frequency modulated by the selected tone. The frequency-modulated signal is intercepted by antenna 17 due to its inductive relation with transmitting antenna 9, and is supplied by antenna circuit 17, 18 to a radio frequency amplifier 19. The amplified signal from amplifier 19 is limited in unit 20 and detected in discriminator-detector 21. The detected tone from detector 21 is amplified in amplifiers 22 and 23, and the amplified tone actuates vibratory unit 25 of the particular receiver for which the message is intended. Actuation of the vibratory unit causes the speaker 26 to be intermittently connected to a potential source at the audible frequency of the calling tone to set up a buzz in the receiver. Upon hearing this buzz, the user presses switch 24 from its standby to its operative position and this connects the speaker directly to power amplifier 25. This actuation of switch 24 enables the speaker to reproduce the subsequent voice message that is frequency modulated on the carrier.

Figure 2:
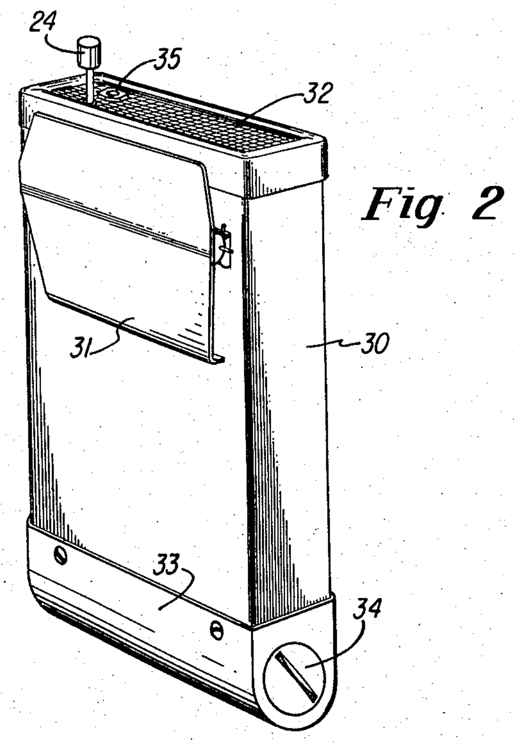
Fig. 2 is a perspective view of a typical receiver that may be used in practicing the invention.

The typical receiver is shown in Fig. 2 and the illustrated receiver is enclosed in a housing 30. The housing has a spring-biased pocket clip 31 pivoted to one face thereof, and it also has a grill-like top portion 32 through which the audible sounds from a minature speaker in the unit emerge. The receiver also includes a casing 33 secured to the bottom of housing 30, and casing 33 holds a battery which constitutes the unidirectional biasing potential source for the unit. Casing 33 has a cap 34 for removing and replacing the battery. Switch 24 is in the form of a spring-biased push-button extending from the top of the unit, and as noted previously, the switch normally is spring-biased to its standby position. Upon the occurrence of a buzz in the speaker of the unit, the user presses switch 24 so that the subsequent message may be received. The unit may also be equipped with a jack 35 to permit the use of ear phones in extremely noisy conditions. The unit may be sufficiently small to enable it to be conveniently carried on the person of the user. For example, a constructed embodiment of the receiver has the following over-all dimensions: 6" x 2½" x 1".

Figure 3:
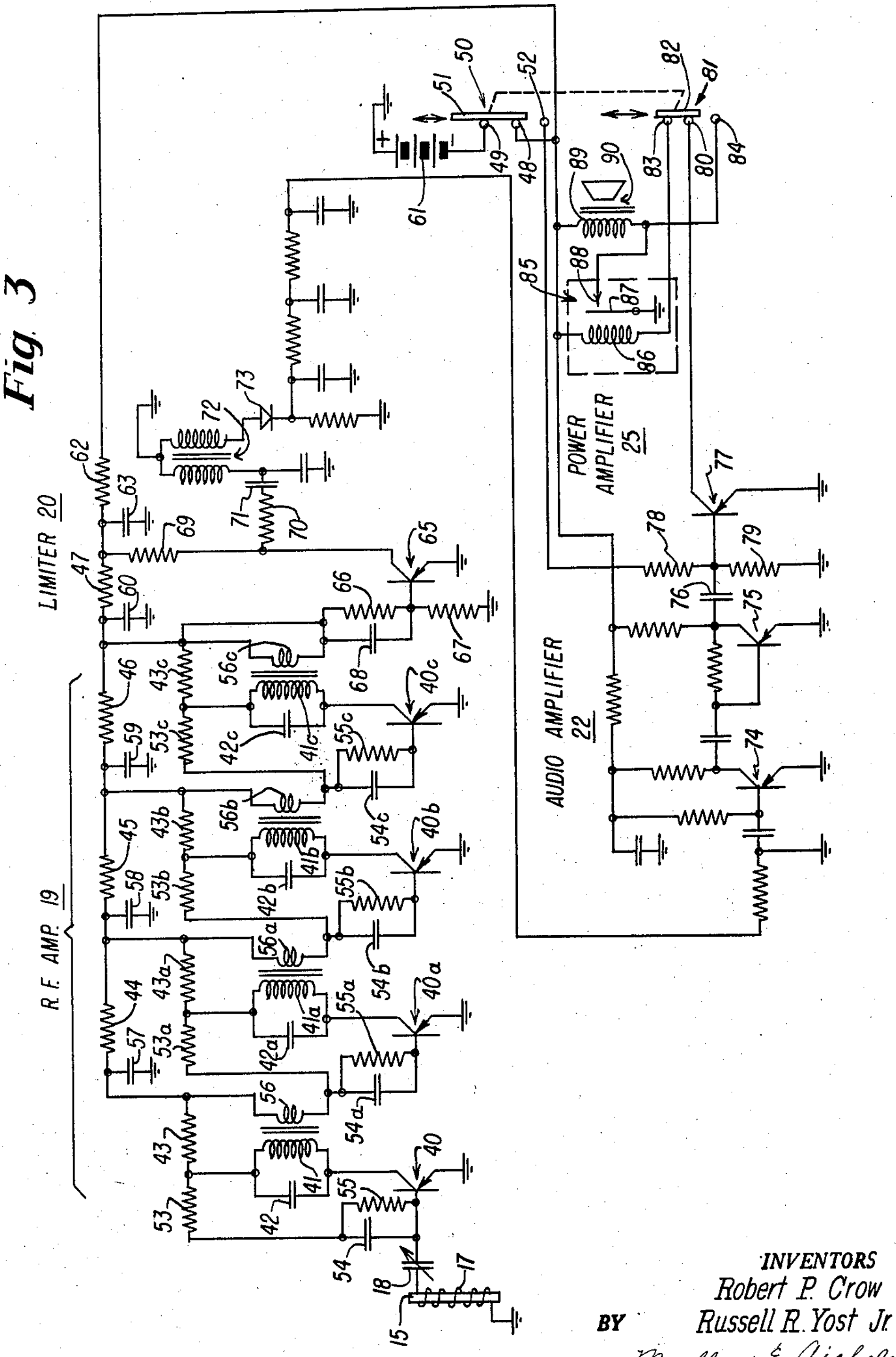
Fig. 3 is a circuit diagram of one embodiment of the improved paging receiver of the present invention.

Referring now to Fig. 3, it can be seen that the series capacitor 18 in the antenna circuit is connected to the base electrode of a transistor 40, which transistor is connected to constitute the first stage of radio frequency amplifier 19. The emitter electrode of transistor 40 is connected to a point of reference potential or ground, and the collector electrode is connected to the lower side of an inductive winding 41, this winding being shunted by a capacitor 42 to form a parallel-resonant circuit tuned to the received carrier frequency. The other side of winding 41 is connected to the negative terminal of a source of unidirectional biasing potential 61 through resistors 43, 44, 45, 46, 47, 62 and by way of contacts 48 and 49 of switch 50. Contacts 48 and 49 are shorted by a moving arm 51 of switch 50 which in one position shorts these two contacts and which in a second position shorts these contacts and an additional contact 52. The positive terminal of source 61 is connected to a point of reference potential or ground.

The upper side of winding 41 is connected back to the base electrode of transistor 40 through a resistor 53 and a capacitor 54 for neutralizing purposes, the capacitor 54 being shunted by a resistor 55 so as to establish a direct-current biasing path to the base electrode.

The winding 41 is inductively coupled to a further winding 56, which, in turn, is coupled to the transistor 40*a* of the second radio frequency amplifier stage. The connections of all four radio frequency amplifiers are generally similar, and need not be described separately. To facilitate the description, like elements in each case have been represented by like numerals with distinguishing letters. The common junction of the resistors 43–47, 62 are established at ground potential for alternating current by respective by-passing capacitors 57–60, 63.

The winding 56*c* is connected to the base electrode of a transistor 65 through a resistor 66, the base electrode being connected to ground through a resistor 67 and resistor 66 being shunted by a capacitor 68. Device 65 is connected in known manner as an amplitude limiter, and its collector electrode is returned through the resistor 69 to the junction of resistors 47 and 62 to derive direct-current bias.

The collector electrode of limiter transistor 65 is connected through a resistor 70 and capacitor 71 to a frequency discriminator transformer 72 in detector 21. The discriminator transformer 72 is connected in known manner to a diode 73 to form a diode slope detector for frequency modulation signals and constitute the discriminator detector 21. The output from the discriminator detector is supplied to audio amplifier 22 which comprises a pair of cascade connected transistors 74, 75, connected in known manner as grounded-emitter stages. The collector electrode of transistor 75 is coupled through the capacitor 76 to the base electrode of a transistor 77, the latter transistor being connected to form the power amplifier 23 of the receiver. The emitter electrode of transistor 77 is connected to ground, and its base electrode is connected through a resistor 78 to the contact 52 of switch 50 and to ground through a resistor 79. The collector electrode of transistor 77 is connected to a contact 80 of a switch 81. Switch 81 has a movable bar 82 which connects contact 80 either to a contact 83 or to a contact 84. Switch 81 is mechanically coupled to switch 50 for unicontrol and, in the standby position of these switches, contacts 48 and 49 are connected together and contacts 83 and 80 are connected together. In the second or operated position of these switches, contacts 48, 49 and 52 are connected together and contacts 80 and 84 are connected together. The switches are preferably spring-biased to their standby position.

The receiver also includes a frequency-selective electromechanical vibratory unit 85, having an actuating coil 86 connected between contact 48 of switch 50 and contact 83 of switch 82. The unit also has a vibrating reed 87 connected to ground and making selective contact with a contact 88 at an audible rate when the reed is set in motion by an electric current of a selected frequency through coil 86. The unit 85 may, for example, be of the general type disclosed in Patent 2,547,026—Winkler, which issued April 3, 1951; or in Patent 2,688,059—Holzinger et al., which issued August 31, 1954. The unit is constructed to respond only to a selected tone frequency, and, in the presence of a signal of that frequency; reed 87 vibrates, making intermittent contact with contact 88 at an audible rate. Contact 88 is connected to the energizing coil 89 of a speaker or sound reproducer 90 and to contact 84 of switch 81. The other side of the coil 89 is connected to terminal 48 of switch 50.

The switches 50 and 81 are illustrated as in the standby position of the receiver. In that position, power amplifier 77 is biased to a class B condition so that the over-all battery drain is reduced to the vicinity, for example, of four milliamps. However, when the switches are actuated to the operative position, a negative bias is placed on the base electrode of transistor 77 through resistors 78 and 79 and closed contacts 49 and 52. This biases the power transistor 77 to a class A condition for maximum gain and undistorted output of the received message, and this produces an over-all battery drain of around 20 milliamps when the receiver is in this operating condition.

Assume now that the receiver is in the standby condition and a carrier wave is received that is frequency modulated by a tone corresponding to the selective characteristics of its particular vibratory unit 85. The received signal is amplified in the four-stage transistor amplifier 19, amplitude limited in limiter 20 and detected in detector 21. The resulting tone is amplified in audio amplifier 22, and sufficient power amplification is provided by the class B power amplifier 77 to cause the tone to energize the coil 86 of the vibratory unit 85 with pulses of current recurring at the frequency rate of the tone, the tone being applied to this coil from the power amplifier through the closed contacts 80 and 83 of switch 81. This energization of the vibratory unit at the selected frequency causes the reed 87 to vibrate so as to intermittently open and close contact 88 and connect the lower side of the energizing coil of speaker 89 intermittently to ground at an audible rate. This sends up a loud buzz in the speaker 90 to apprise the user that a message is about to be sent him. The user then presses switches 50 and 81 to the operative position. This causes power amplifier 77 to rise from class B to class A operation in the manner previously mentioned for maximum gain and undistorted output, and this also places speaker 89 directly across the collector electrode of power transistor 77 through contacts 80 and 84 of switch 81, the vibratory unit 85 now being disconnected due to the opening of contact 83.

The invention provides, therefore, a practical miniature receiver for use in a frequency modulation paging system; which receiver is completely transistorized for minimum space and power requirements. As described herein the receiver is designed to have a standby condition of reduced power drain and in that condition it responds to a tone only when the tone has a particular frequency to which the receiver is set. Receipt of its individual tone, sets up a buzz in the speaker due to the described action of an electromechanical vibratory unit in the receiver. The user then sets the receiver to receive the subsequent message with increase gain over its standby condition.

We claim:

1. In a selective calling paging system utilizing a carrier wave modulated with a calling tone of a given audio frequency and with further audio intelligence, a receiver for the carrier wave including in combination, a pocket size housing, a receiver circuit enclosed in said housing comprising built-in antenna means, an energizing battery, sound reproducer means, and a plurality of semiconductor devices for amplifying and detecting a received wave, said receiver circuit further having an audio amplifier circuit including an output transistor, a manually operable switch having first contacts closed in a released condition thereof and second contacts closed in an operated condition thereof, an electro-mechanical vibrator device with vibrator contacts responsive to the calling tone, a circuit connecting said vibrator device through said first contacts to said output transistor for energizing said vibrator device in response to the calling tone in the released condition of said switch, a circuit connecting said vibrator contacts in series with said battery and said sound reproducer means to provide an audible signal upon energization of said vibrator device, and a circuit connecting said output transistor through said second contacts of said switch to said sound reproducer means so that the audio intelligence may be reproduced thereby upon operation of said switch.

2. In a selective calling paging system utilizing a carrier wave modulated with a calling tone of a given audio frequency and with further audio intelligence, a receiver for the carrier wave, including in combination, a pocket size housing, a receiver circuit enclosed in said housing comprising built-in antenna means, an energizing battery, sound reproducer means, a plurality of semiconductor devices for amplifying and detecting a received wave, a manually operable switch having first contacts closed in a released condition thereof and second contacts closed in an operated condition thereof, an electro-mechanical vibrator device with vibrator contacts responsive to the calling tone, said receiver circuit further having an output circuit including an output transistor, said output circuit having a portion connecting said vibrator device and said first contacts and said reproducer means in a tone responsive circuit for operating said vibrator device in response to the calling tone in the released condition of said switch and energizing said reproducer means to provide an audible signal, said output circuit also having a portion connected to said second contacts of said switch for connecting said output transistor through said sound reproducer means so that the audio intelligence may be reproduced thereby upon operation of said switch, with such operation of said switch opening said first contacts and disconnecting said vibrator device.

3. In a selective calling paging system utilizing a carrier wave modulated with a calling tone of a given audio frequency and with further audio intelligence, a receiver for the carrier wave including in combination, an elongated pocket-size housing, a pocket clip attached to one side of said housing and positioned to support said housing with one end thereof facing upward, a receiver circuit enclosed in said housing to form a unit comprising built-in antenna means, an energizing battery, a plurality of semiconductor devices for amplifying and detecting a received wave, and sound reproducer means disposed adjacent said one end of said housing, said receiver circuit further having an audio amplifier circuit including an output transistor, a switch having a manually operable control at said one end of said housing, said switch further having first contacts closed in a released condition thereof and second contacts closed in an operated condition thereof, an electro-mechanical vibrator device with vibrator contacts responsive to a given tone of the plurality of tones, a circuit connecting said vibrator device through said first contacts to said output transistor for energizing said vibrator device in response to the given tone in the released condition of said switch, a circuit connecting said vibrator contacts in series with said battery and said sound reproducer means to provide an audible signal upon energization of said vibrator device, and a circuit connecting said output transistor through said second contacts of said switch to said sound reproducer means so that the audio intelligence may be reproduced thereby.

4. In a selective calling paging system utilizing a carrier wave modulated with a calling tone of a given audio frequency and with further audio intelligence, a receiver for the carrier wave, including in combination, a pocket size housing, a receiver circuit enclosed in said housing and comprising built-in antenna means, an energizing battery, sound reproducer means, and a plurality of semiconductor devices for amplifying and detecting a received wave, each of said receivers further having an audio amplifier circuit including an output transistor with a bias network therefor, a manually operable switch having first contacts closed in a released condition thereof and second contacts closed in an operated condition thereof, an electro-mechanical vibrator device with vibrator contacts responsive to the calling tone, a circuit connecting said vibrator device through said first contacts to said output transistor for energizing said vibrator device in response to the calling tone in the released condition of said switch, a circuit connecting said vibrator contacts in series with said battery and said sound reproducer means to provide an audible signal upon energization of said vibrator device, a circuit connecting said output transistor through said second contacts of said switch to said sound reproducer means so that the audio intelligence may be reproduced thereby, and a further circuit connected to said second contacts and said bias network for changing the bias on said output transistor upon operation of said switch.

5. The receiver of claim 4 in which said bias network biases said output transistor for class B operation with said switch in the released condition and said further circuit biases said output transistor for class A operation with said switch in the operated condition.

6. A selective calling paging system including in combination, a transmitter having selector means adapted to be operated for producing a carrier wave frequency modulated with a calling tone of a plurality of audio frequency tones and means for frequency modulating the carrier wave with further audio intelligence, loop antenna means coupled to said transmitter and surrounding an area subject to paging communication, a plurality of unitary receivers for the carrier wave, each of said receivers being of a size adapted to fit a user's pocket and including built-in antenna means, an energizing battery and a plurality of semiconductor devices for amplifying and detecting a received carrier wave, each of said receivers further having an audio amplifier circuit including an output transistor, sound reproducer means, a manually operable switch having first contacts closed in a released condition thereof and second contacts closed in an operated condition thereof, an electro-mechanical vibrator device with vibrator contacts responsive to a given tone of the plurality of tones, a circuit connecting said vibrator device through said first contacts to said output transistor for energizing said vibrator device in response to the given tone in the released condition of said switch, a circuit connecting said vibrator contacts in series with said battery and said sound reproducer means to provide an audible signal upon energization of said vibrator device, and a circuit connecting said output transistor through said second contacts of said manual switch to said sound reproducer means so that the audio intelligence may be reproduced thereby.

7. In a selective calling paging system utilizing a carrier wave modulated with calling tone components of given audio frequency and with further audio intelligence, a receiver for the carrier wave, including in combination, a pocket size housing, a receiver circuit enclosed in said housing comprising built-in antenna means and an energizing battery, said receiver circuit further including sound reproducer means, a plurality of semiconductor devices for amplifying and detecting a received wave, a manually operable switch having first contacts closed in a released condition thereof and second contacts closed in an operated condition thereof, electro-mechanical vibrator means responsive to the calling tone components, and having vibrator contacts therein, said receiver circuit further having an audio signal circuit including output transistor means, said audio signal circuit having a circuit portion connecting said vibrator means and said first contacts and said output transistor means and said reproducer means in a tone component responsive circuit for operating said vibrator means in response to the calling tone components in the released condition of said switch and energizing said reproducer means to provide an audible calling signal therefrom, said audio signal circuit also having a circuit portion connected to said second contacts of said switch for operatively inter-connecting in said receiver circuit said audio signal circuit and said sound reproducer means so that the audio intelligence is reproduced thereby upon operation of said switch, with such operation of said switch opening said first contacts and disconnecting said vibrator means.

8. The receiver of claim 7 in which said audio signal circuit includes a bias network for said output transistor means, said bias network including resistor means coupled to said battery for biasing said transistor means to relatively low level conduction and said bias network further including circuit means connected to said second contacts of said switch for biasing said transistor means to relatively high level conduction upon operation of said switch means.

References Cited in the file of this patent

UNITED STATES PATENTS

| | | |
|---|---|---|
| 2,367,327 | Beers | Jan. 16, 1945 |
| 2,494,451 | Olson | Jan. 10, 1950 |
| 2,531,416 | Ferrar | Nov. 28, 1950 |
| 2,541,050 | Halstead | Feb. 13, 1951 |
| 2,602,853 | Harrison | July 8, 1952 |
| 2,647,957 | Mallincrodt | Aug. 4, 1953 |